United States Patent
Chen

(10) Patent No.: US 7,081,332 B2
(45) Date of Patent: *Jul. 25, 2006

(54) METHOD FOR MANUFACTURING A LIGHT GUIDE PLATE MOLD AND A LIGHT GUIDE PLATE

(75) Inventor: Ga-Lane Chen, Fremont, CA (US)

(73) Assignee: HON HAI Precision Industry Co., Ltd., Tu-cheng (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/928,993

(22) Filed: Aug. 27, 2004

(65) Prior Publication Data

US 2005/0142499 A1    Jun. 30, 2005

(30) Foreign Application Priority Data

Dec. 31, 2003    (TW) .............................. 92137547 A

(51) Int. Cl.
*G02B 6/10* (2006.01)
(52) U.S. Cl. ..................... 430/321; 430/320; 264/1.24; 264/2.5
(58) Field of Classification Search ..................... None
See application file for complete search history.

(56) References Cited

U.S. PATENT DOCUMENTS

2003/0020189 A1*    1/2003    Chen et al. ................. 264/1.24
2003/0086030 A1*    5/2003    Taniguchi et al. ............ 349/61

* cited by examiner

*Primary Examiner*—John A. McPherson
(74) *Attorney, Agent, or Firm*—Morris, Manning & Martin; Tim Tingkang Xia, Esq.

(57) ABSTRACT

A method for manufacturing a light guide plate (70) includes: providing a first substrate (30); coating a photo-resist (600) on the first substrate; exposing the photo-resist using a photo mask; developing the photo-resist; anisotropically dry etching the first substrate; removing remaining photo-resist (640), thereby providing a mold (40); providing a second substrate (50) and a hot-embossing machine (80), and conducting hot-embossing of the second substrate using the mold and the hot-embossing machine, thereby providing the light guide plate. By using the above-described dry etching and hot-embossing methods, a pattern of the photo mask is precisely transferred to the first substrate and the light guide plate. A diameter of the each of micro-dots formed on the light guide plate is as little as 10 nanometers. Thus a uniformity of luminance and color provided by the entire light guide plate is improved.

15 Claims, 3 Drawing Sheets

METHOD FOR MANUFACTURING A LIGHT GUIDE PLATE MOLD AND A LIGHT GUIDE PLATE

BACKGROUND OF THE INVENTION

1. Field of the Invention

The present invention relates to manufacturing of light guide plates, and particularly to a method for manufacturing a light guide plate using a duly manufactured mold.

2. Description of the Prior Art

Liquid crystal displays (LCDs) are now in widespread use in various applications; for example, in desktop computers, portable computers, LCD televisions, portable telephones, etc. An LCD cannot itself emit light. A light source system such as a back light system is needed for emission of light. A light guide plate is an important part of a back light system, because it controls uniform directionality of emitted light.

FIGS. 8A to 8K represent a conventional process for manufacturing a light guide plate, as disclosed in U.S. Pat. No. 6,522,373 issued on Feb. 18, 2003. The process includes the steps of:

a) applying a primer on a silicon substrate 10 covered with a silicon oxide ($SiO_2$) film 11 to thereby enhance adhesion of a photo resist on the silicon oxide film, and forming a layer of photo-resist 12 on the silicon substrate 10 (FIG. 8A);

b) disposing a photo mask 13 having a pattern of concave small dots onto the silicon substrate 10, irradiating the silicon substrate 10 with ultraviolet (UV) rays from above the photo mask 13, and developing the photo-resist 12 to thereby form a pattern of concave small dots in the photo-resist 12 (FIG. 8B);

c) attaching a protective tape 14 onto an undersurface of the silicon substrate 10, and etching the silicon oxide film 11 to thereby form a pattern of concave small dots in the silicon oxide film 11 (FIG. 8C);

d) removing residual photo-resist 12 (FIG. 8D);

e) anisotropically etching a surface of the silicon substrate 10, with the silicon oxide film 11 functioning as a mask (FIG. 8E);

f) removing the protective tape 14, and removing the silicon oxide film 11 (FIG. 8F);

g) forming a conductive film 15 on the silicon substrate 10, for metal plating (FIG. 8G);

h) applying a metal plating onto the conductive film 15 as an electrode, and then separating the metal plating from the conductive film 15 to thereby obtain a master stamper 16 (FIG. 8H);

i) forming a very thin separator layer on an undersurface of the master stamper 16, plating the master stamper 16 at the separator layer, and then separating the plating from the master stamper 16 to thereby obtain a mother stamper 17 (FIG. 8I);

j) forming a very thin separator layer on a main surface of the mother stamper 17, plating the mother stamper 17 at the separator layer, and then separating the plating from the mother stamper 17 to thereby obtain a molding stamper 18 (FIG. 8J); and k) polishing a dot-forming surface of the molding stamper 18, polishing an opposite undersurface of the molding stamper 18, attaching the molding stamper 18 to injection molding equipment, and performing injection molding to thereby obtain a light guide plate 1 (FIG. 8K).

A pattern of concave small dots is thus formed in a main surface of the light guide plate 1. Each small dot defines a short side and a long side. A length of each short side is in the range from 10 to 100 µm. A length of each long side is at least 1.5 times the length of each short side, and no greater than 500 µm. Notably, when the length of each short side is greater than 10 µm, uniform luminance and color of the light guide plate tends to be reduced. In addition, the process for manufacturing the light guide plate 1 is complex. It takes three plating steps in order to form the master stamper, the mother stamper and the molding stamper. Then the molding stamper is used to finally obtain the light guide plate 1. All these processes are also time-consuming.

Therefore, it is desired to provide a new method for manufacturing a light guide plate which overcomes the above-described disadvantages of conventional processes.

SUMMARY OF THE INVENTION

An object of the present invention is to provide a method for manufacturing a light guide plate which is relatively simple and not unduly time-consuming, said method including a method for manufacturing a mold.

Another object of the present invention is to provide a method for manufacturing a light guide plate such that the light guide plate can deliver enhanced uniformity of luminance.

In order to achieve the above-described objects, a method in accordance with the present invention includes: providing a first substrate; coating a photo-resist on the first substrate; exposing the photo-resist using a photo mask; developing the photo-resist; anisotropically dry etching the first substrate; removing remaining photo-resist, thereby providing a mold; providing a second substrate and a hot-embossing machine, and conducting hot-embossing of the second substrate using the mold and the hot-embossing machine; and removing the second substrate from the hot-embossing machine, thereby providing the light guide plate.

By using the above-described anisotropically dry etching and hot-embossing methods, a pattern of the photo mask is precisely transferred to the first substrate and the light guide plate. A diameter of each of micro-dots formed on the light guide plate is as little as 10 nanometers. Thus a uniformity of luminance and color provided by the entire light guide plate is improved. Furthermore, no electroplating steps are needed, unlike in the prior art. This saves much time and money.

Other objects, advantages, and novel features of the present invention will become more apparent from the following detailed description when taken in conjunction with the accompanying drawings.

DETAILED DESCRIPTION OF THE PRESENT INVENTION

Reference now will be made to the drawings to describe the present invention in detail.

Figure 1:
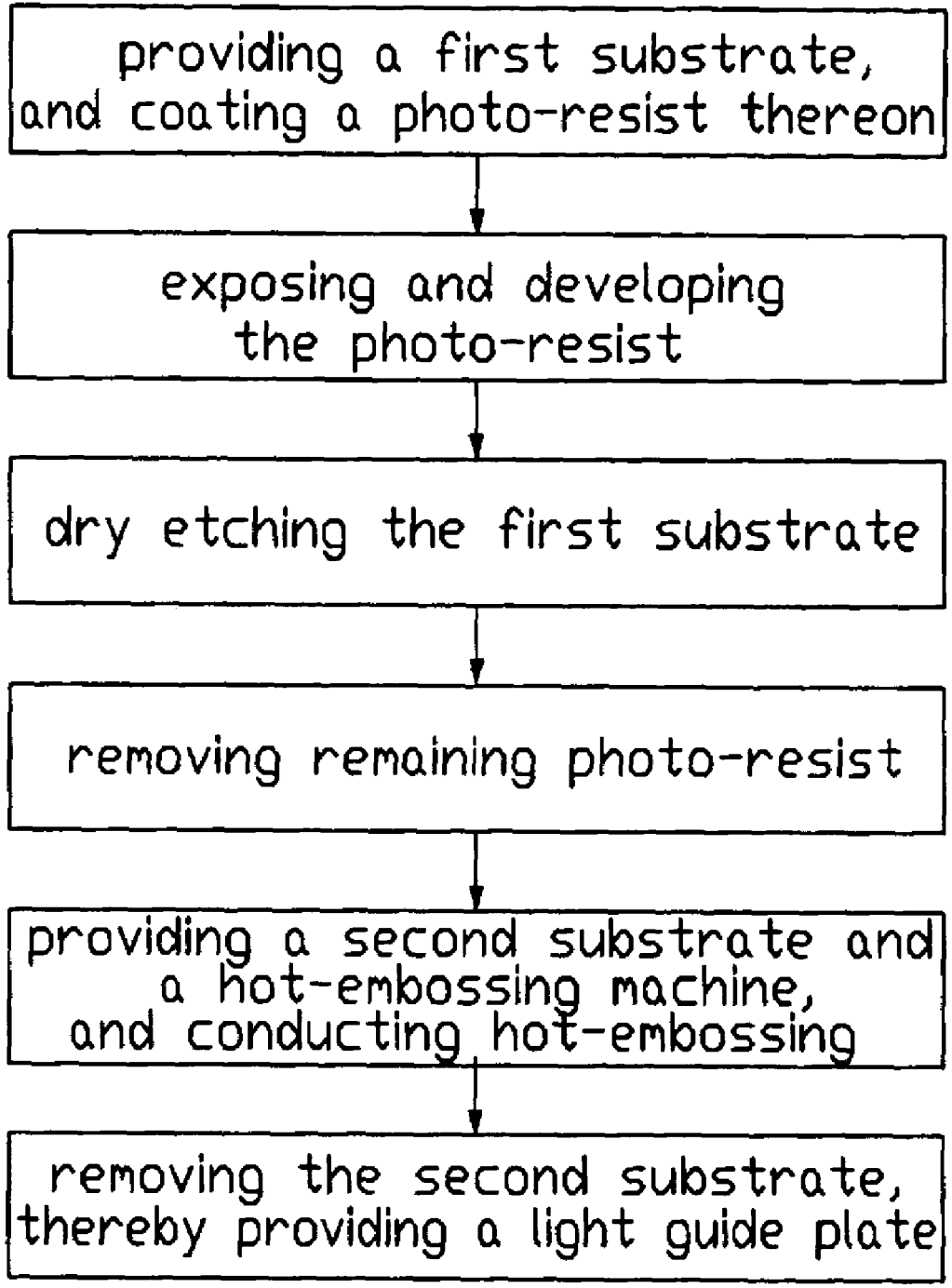
FIG. 1 is a flow chart of a process for manufacturing a light guide plate in accordance with the present invention.

FIG. 1 is a flow chart for manufacturing a light guide plate. The process includes the steps of:
1) providing a first substrate, and coating a photo-resist thereon;
2) exposing the photo-resist using a photo mask having a micro-dot pattern, and developing the photo-resist;
3) anisotropically dry etching the first substrate so that the pattern of micro-dots of the photo mask is transferred thereto;
4) removing remaining photo-resist from the first substrate to thereby provide a mold;
5) providing a second substrate and a hot-embossing machine, and conducting hot-embossing of the second substrate using the mold; and
6) removing the second substrate from the hot-embossing machine, thereby providing the light guide plate.

Figure 2:
FIG. 2 is a schematic, cross-sectional view a photo-resist coated on a first substrate in accordance with the process of the present invention.

FIGS. 2 to 7 are schematic, cross-sectional views illustrating stages in the above-described process. FIG. 2 shows the initial step wherein a first substrate 30 made of silicon is provided. The first substrate 30 is baked in a vacuum or in a nitrogen environment for dehydration. The baking is performed between 100 and 120° C., for 4~6 minutes. After that, a photo-resist 600 is coated on the first substrate 30 by a spin-coating method or a spray-coating method. The material of the photo-resist 600 may be a fluid-like or film-like positive type or negative type material. In this embodiment, a negative type material is used. Then the first substrate 30 with the photo-resist 600 is baked at 90~100° C., for 20~30 minutes.

Figure 3:
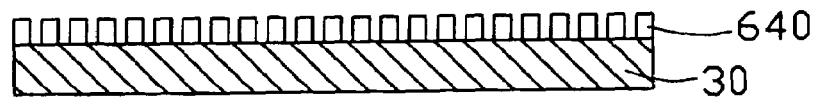
FIG. 3 is similar to FIG. 2, but showing the photo-resist changed after exposing and developing steps have been performed.

In the second step illustrated in FIG. 3, a photo mask (not shown) is disposed on the first substrate 30, and the photo-resist 600 on the first substrate 30 is exposed through the photo mask using ultraviolet radiation. The photo mask has a pattern comprising circular micro-dots. A diameter of each micro-dot is 10 nanometers, and a distance between adjacent micro-dots is 20 nanometers.

After exposure, the first substrate 30 is baked again to harden the exposed photo-resist 600. Then a developing solution is sprayed on the photo-resist 600, and the first substrate 30 is maintained for 20~30 seconds in order to fully dissolve unexposed portions of the photo-resist 640.

Figure 4:
FIG. 4 is similar to FIG. 3, but showing the first substrate after an etching step has been performed.

In the third step shown in FIG. 4, the first substrate 30 is anisotropically etched by dry etching method, for example, an ion beam etching method or a reaction ion etching method. In this embodiment, a reaction ion etching method is used. The reaction ion gas comprises the element chlorine (Cl), and may for example be carbon tetrachloride ($CCl_4$), boron chloride ($BCl_3$) or chlorine ($Cl_2$). The first substrate 30 is disposed in a reaction room (not shown), in which the electric potential is between 300~500 volts and the pressure is between $10^{-1}$~$10^{-3}$ torr. In this low pressure environment, the gas is accelerated to bombard the first substrate 30. Parts of the first substrate 30 not covered by remaining portions of the exposed photo-resist 640 are bombarded by the gas, and other parts of the substrate 30 covered by remaining portions of the photo-resist 640 are protected from being bombarded by the gas. The reaction ion etching is anisotropic etching, and the etching speed in horizontal directions approaches zero. Thus the pattern of micro-dots of the photo mask is transferred to the first substrate 30. The diameter of each micro-dot 42 (see FIG. 5) of the first substrate 30 approaches that of each micro-dot of the photo mask. That is, a diameter of each micro-dot 42 of the first substrate 30 is substantially 10 nanometers.

Figure 5:
FIG. 5 is similar to FIG. 4, but showing the first substrate after remaining portions of the photo-resist have been removed; that is, showing a mold manufactured in accordance with the process of the present invention.

As shown in FIG. 5, the remaining portions of the photo-resist 640 are removed, thereby providing a mold 40 with the pattern of micro-dots 42. Each micro-dot 42 is cylindrical. The diameter of each micro-dot 42 is substantially 10 nanometers, and a distance between adjacent micro-dots 42 is 20 nanometers.

Figure 6:
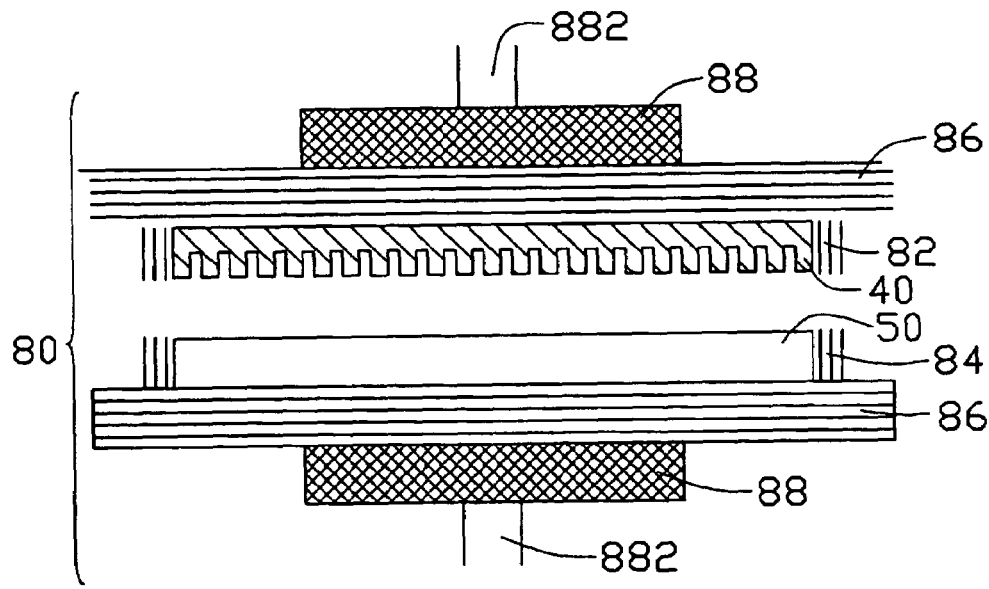
FIG. 6 is a schematic, cross-sectional view of a process of embossing a second substrate using the mold of FIG. 5, in accordance with the present invention.

As shown in FIG. 6, the mold 40 is set in a hot-embossing machine 80. The hot-embossing machine 80 includes a mold accommodating space 82, a substrate accommodating space 84, two heating devices 86, and two cooling devices 88. Each of the cooling devices 88 has a cooling channel 882. A second substrate 50 is set in the substrate accommodating space 84, and the mold 40 is set in the mold accommodating space 84. The material of the second substrate 50 is polymethyl methacrylate. The second substrate 50 is heated by the heating device 86 to 90~95° C., at which temperature the second substrate 50 begins to melt. Then, the mold 40 is moved down to press onto the second substrate 50. After that, the second substrate 50 is cooled with running water or air fed trough the cooling channels 882.

Figure 7:
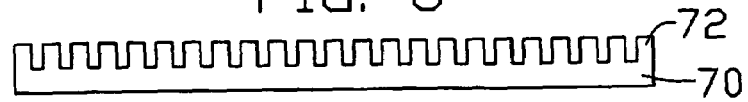
FIG. 7 is a schematic, cross-sectional view of the second substrate after the embossing of FIG. 6 has been performed; that is, showing the light guide plate manufactured in accordance with the process of the present invention.
Figure 8A:
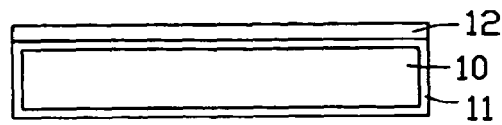
FIGS. 8A to 8K are schematic, cross-sectional views showing successive stages in a conventional process for manufacturing a light guide plate.
Figure 8B:
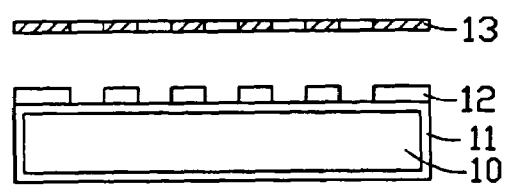
Figure 8C:
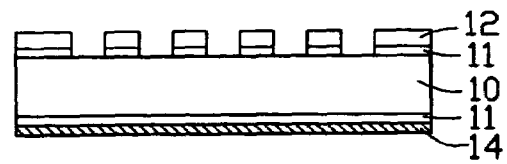
Figure 8D:
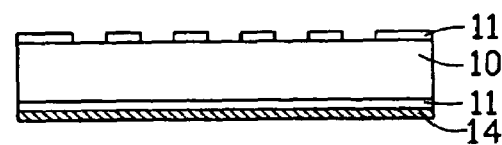
Figure 8E:
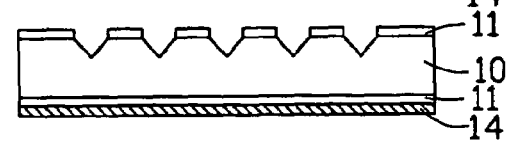
Figure 8F:
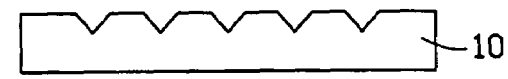
Figure 8G:
Figure 8H:
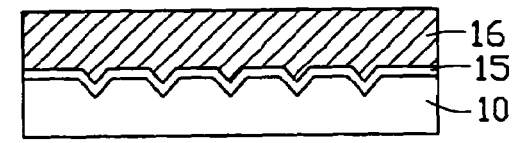
Figure 8I:
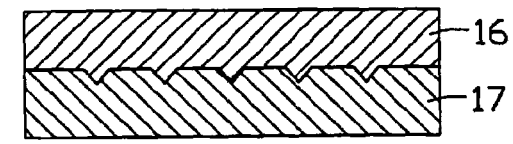
Figure 8J:
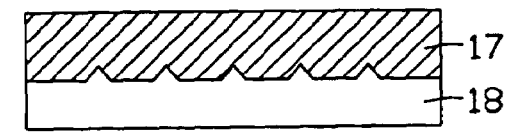
Figure 8K:
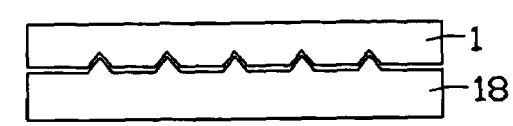

In the last step illustrated in FIG. 7, the second substrate 50 is removed from the hot-embossing machine 80, thereby providing a light guide plate 70. A surface of the light guide plate 70 has a pattern of micro-dots 72. A diameter of each micro-dot 72 is the same as that of each micro-dot 42 of the mold 40; that is, 10 nanometers. A distance between adjacent micro-dots 72 is 20 nanometers.

By using the above-described anisotropically dry etching and hot-embossing methods, the pattern of the photo mask is precisely transferred to the first substrate 30 and the light guide plate 70. A size of each micro-dot 72 is only 10 nanometers. Therefore a uniformity of luminance and color provided by the entire light guide plate 70 is improved. Furthermore, no electroplating steps are needed, unlike in the prior art. This saves much time and money.

Moreover, the size of each micro-dot 72 can be varied according to need. For example, the diameter of each micro-dot 72 can be in the range from 10 nanometers to 50 nanometers. The distance between adjacent micro-dots 72 can be in the range from 10 nanometers to 100 nanometers.

It is to be understood, however, that even though numerous characteristics and advantages of the present invention have been set forth in the foregoing description, together with details of the function of the invention, the disclosure is illustrative only, and changes may be made in detail to the full extent indicated by the broad general meaning of the terms in which the appended claims are expressed.

What is claimed is:

1. A method for manufacturing a light guide plate, comprising the steps of:
providing a first substrate;
coating a photo-resist on the first substrate;

exposing the photo-resist using a photo mask, the photo mask containing a micro-dot pattern;

developing the photo-resist;

anisotropically dry etching the first substrate;

removing remaining photo-resist, and thereby providing a mold;

providing a second substrate and a hot-embossing machine, and conducting hot-embossing of the second substrate using the mold and the hot-embossing machine; and removing the second substrate from the hot-embossing machine, thereby providing the light guide plate having micro-dots thereon, the micro-dots each having a diameter of 50 nanometers or less.

2. The method for manufacturing a light guide plate as claimed in claim 1, wherein the diameter of each micro-dot is in the range from 10 nanometers to 50 nanometers.

3. The method for manufacturing a light guide plate as claimed in claim 1, wherein a distance between adjacent micro-dots is 100 nanometers or less.

4. The method for manufacturing a light guide plate as claimed in claim 3, wherein the distance between adjacent micro-dots is in the range from 10 nanometers to 100 nanometers.

5. The method for manufacturing a light guide plate as claimed in claim 1, wherein the step of anisotropically dry etching the first substrate comprises ion beam etching or reaction ion etching.

6. A method for manufacturing a mold for molding a light guide plate, comprising the steps of:

providing a substrate;

coating a photo-resist on the substrate;

exposing the photo-resist using a photo mask, the photo mask containing a micro-dot pattern;

developing the photo-resist;

anisotropically dry etching the substrate; and removing remaining photo-resist, thereby providing the mold having micro-dots thereon, the micro-dots each having a diameter of 50 nanometers or less.

7. The method for manufacturing a mold as claimed in claim 6, wherein the diameter of each micro-dot is in the range from 10 nanometers to 50 nanometers.

8. The method for manufacturing a mold as claimed in claim 6, wherein a distance between adjacent micro-dots is 100 nanometers or less.

9. The method for manufacturing a mold as claimed in claim 8, wherein the distance between adjacent micro-dots is in the range from 10 nanometers to 100 nanometers.

10. The method for manufacturing a mold as claimed in claim 6, wherein the step of dry etching the substrate comprises ion beam etching or reaction ion etching.

11. A method for manufacturing a light guide plate, comprising the steps of:

providing a mold substrate;

coating a photo-resist on a side of said mold substrate and coveting a photomask thereon to expose portions of said coated photo-resist to a predetermined light illuminating through said photomask, said photomask containing a micro-dot pattern;

developing said photo-resist to expose portions of said side of said mold substrate through remaining portions of said photo-resist;

anisotropically etching said exposed portions of said side of said mold substrate to form a mold, and removing said remaining portions of said photo-resist;

disposing said mold spaced from a light-guide substrate with said side of said mold substrate facing said light-guide substrate;

heating uniformly said light-guide substrate to a predetermined temperature so as to transform a facing-said-mold surface of said light-guide substrate into a mold-changeable status, and moving said mold to pressuredly contact said surface of said light-guide substrate; and cooling down said light-guide substrate to form said light guide plate having micro-dots thereon, the micro-dots each having a diameter of 50 nanometers or less.

12. The method for manufacturing a light guide plate as claimed in claim 11, wherein said anisotropically etching process is an anisotropic dry etching process.

13. The method for manufacturing a light guide plate as claimed in claim 11, wherein the diameter of each micro-dot is in the range from 10 nanometers to 50 nanometers.

14. The method for manufacturing a light guide plate as claimed in claim 11, wherein a distance between adjacent micro-dots is 100 nanometers or less.

15. The method for manufacturing a light guide plate as claimed in claim 14, wherein the distance between adjacent micro-dots is in the range from 10 nanometers to 100 nanometers.

* * * * *